United States Patent [19]

Chen et al.

[11] Patent Number: 5,627,241

[45] Date of Patent: May 6, 1997

[54] SHEET AND TUBE ORGANOSILICON POLYMERS

[75] Inventors: Chenggang Chen, Cleveland, Ohio; Dimitris E. Katsoulis, Midland, Mich.; Malcolm E. Kenney, Cleveland Heights, Ohio

[73] Assignees: Dow Corning Corporation, Midland, Mich.; Case Western University, Cleveland, Ohio

[21] Appl. No.: 710,700

[22] Filed: Sep. 19, 1996

[51] Int. Cl.$^6$ ...................... C08G 77/00
[52] U.S. Cl. ............ 525/474; 525/475; 525/478; 525/479; 523/212; 523/213; 524/588; 524/862; 528/9; 528/15; 528/25; 528/31; 528/32; 528/39
[58] Field of Search ............ 525/474, 475, 525/478, 479; 523/212, 213; 524/588, 862; 528/9, 15, 31, 25, 32, 39

[56] References Cited

U.S. PATENT DOCUMENTS

| | | | |
|---|---|---|---|
| 2,823,218 | 2/1958 | Speier | 260/448 |
| 3,661,846 | 5/1972 | Kenney | 260/46 |
| 3,692,816 | 9/1972 | Faille et al. | |
| 3,839,082 | 10/1974 | Mercier et al. | |
| 3,862,259 | 1/1975 | Van Russelt et al. | |
| 3,904,583 | 9/1975 | Sanders et al. | |
| 4,268,574 | 5/1981 | Peccenini et al. | 428/315 |
| 4,289,651 | 9/1981 | Benton et al. | 252/429 B |
| 4,621,024 | 11/1986 | Wright | 428/404 |
| 4,683,318 | 7/1987 | Deffeves et al. | 556/173 |
| 4,786,558 | 11/1988 | Sumiya et al. | 428/454 |
| 4,911,982 | 3/1990 | Rice | 428/404 |
| 4,942,026 | 7/1990 | Gupta | 423/326 |
| 4,960,816 | 10/1990 | Rice | 424/425 |
| 5,328,683 | 7/1994 | Harashima | 424/63 |
| 5,514,734 | 5/1996 | Maxfield et al. | 523/204 |
| 5,527,871 | 6/1996 | Tani et al. | 528/10 |

OTHER PUBLICATIONS

Polymer Preprints, vol. 32 No. 3, Aug. 1991, pp. 508–509.
Colloids & Surfaces, 63, (1992), pp. 139–149.

*Primary Examiner*—Ralph H. Dean
*Attorney, Agent, or Firm*—James L. DeCesare

[57] ABSTRACT

A method of making an organopolysiloxane sheet or tube polymer involves contacting a sheet or tube silicate with an organo-H-chlorosilane to form an organosiloxane sheet or tube polymer with pendent ≡Si—H groups. Subsequently, the organosiloxane sheet or tube polymer with pendent ≡Si—H groups is contacted with an alkenyl group containing compound in the presence of a hydrosilation catalyst. The catalyst is used in an amount effective to catalyze a hydrosilation reaction between the alkenyl group on the alkenyl group containing compound and the hydride functionality on the organosiloxane sheet or tube polymer with pendent ≡Si—H groups, to form the organopolysiloxane sheet or tube polymer.

16 Claims, No Drawings

SHEET AND TUBE ORGANOSILICON POLYMERS

CROSS-REFERENCE TO RELATED APPLICATIONS

This application is related to a prior U.S. application Ser. No. 08/542,081, filed Oct. 12, 1995, now allowed entitled "Sheet and Tube Siloxane Polymers", in the name of Timothy Chi-Shan Chao, Malcolm E. Kenney, and Dimitris E. Katsoulis. The application is assigned jointly to Case Western Reserve University, Cleveland, Ohio, and Dow Corning Corporation, Midland, Mich.

BACKGROUND OF THE INVENTION

This invention is directed to silicone compounds, and methods of making silicate-based sheet and tube type siloxane polymers.

Silicones are made from silica by reducing it in an electric furnace to elemental silicon, i.e.,

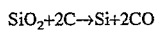
$$SiO_2 + 2C \rightarrow Si + 2CO$$

The elemental silicon is treated with RCl, typically methyl chloride, in the "Direct Process", as the basis of commercial production, i.e.,

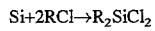
$$Si + 2RCl \rightarrow R_2SiCl_2$$

Hydrolysis of the organochlorosilanes gives siloxane structures which are used in the manufacture of many silicone products, i.e.,

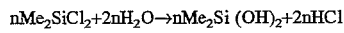
$$nMe_2SiCl_2 + 2nH_2O \rightarrow nMe_2Si(OH)_2 + 2nHCl$$

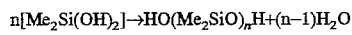
$$n[Me_2Si(OH)_2] \rightarrow HO(Me_2SiO)_nH + (n-1)H_2O$$

Alternative routes to silicones involving the preparation of silicone pollers from silicate materials are embodied in U.S. Pat. No. 3,661,846 (May 9, 1972). The copending U.S. application Ser. No. 08/542,081, is an improvement and furtherance of the efforts described in the '846 patent to find other unique approaches in the manufacture of silicones. This present invention is a modification of the process generally described in the '081 application.

Thus, according to the '081 application, sheet or tube silicates are reacted with an alkenyl group containing chlorosilane to produce an alkenylsiloxy polymer. The alkenylsiloxy polymer is then further reacted with a hydrosilane in the presence of a platinum catalyst to produce an organopolysiloxane polymer.

In this present invention, however, sheet or tube silicates are reacted with an organo-H-chlorosilane to produce an organosiloxane polymer with pendent $\equiv$Si—H groups. The organosiloxane polymer with pendent $\equiv$Si—H groups is then further reacted with an olefin in the presence of a platinum catalyst to produce the organopolysiloxane polymer.

In the '081 application, four of the four reactants contain the silicon atom. In the present invention, only three of the four reactants contain the silicon atom.

Thus, the term hydrosilation applies to the addition of Si—H across any unsaturated species, i.e.

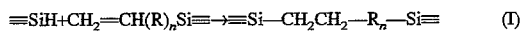
$$\equiv SiH + CH_2 = CH(R)_nSi \equiv \rightarrow \equiv Si-CH_2CH_2-R_n-Si \equiv \quad (I)$$

or

$$\equiv SiH + CH_2 = CHR \rightarrow \equiv Si-CH_2CH_2-R \quad (II).$$

Silanes and siloxanes that contain a silicon bound hydrogen atom can add across the double bond. Typically, these reactions are conducted in the presence of a platinum catalyst or a catalyst which is a complex of platinum. Scenario (I) corresponds generally to the process in the '081 application, whereas Scenario (II) corresponds generally to the process in the present invention.

BRIEF SUMMARY OF THE INVENTION

One object of this invention is to provide new, simple, and versatile routes, to siloxane polymers having segments derived from silicate structures by using readily accessible starting materials, that in many cases, give nontoxic byproducts. Another object is to prepare distinctively shaped organosiloxanes, useful as additives in amorphous silicone materials such as resins, fluids, and gums. They can be used to create supramolecular structures offering benefits in gels, cosmetics, greases, elastomers, sealants and high temperature polymers. In addition, they can be used in catalytic systems and membrane separation processes. They may also be used as rheological additives, fire resistance polymers, molecular reinforcing agents, and for imparting barrier properties and imparting thixotropic properties.

These and other features and objects of the invention will become apparent from a consideration of the detailed description.

DETAILED DESCRIPTION

Our invention relates to the synthesis, characterization, and utilization of certain organofunctional sheet or tube siloxane polymers. These polymers are derived from naturally occurring or synthetic sheet or tube silicates by a two-step process.

The first step consists of the reaction of an organo-H-chlorosilane with a sheet or tube silicate, to produce a sheet or tube-like organosiloxane polymer that contains pendent $\equiv$Si—H groups. Most preferred are organo-H-chlorosilanes with the formula (H) RR' SiCl or (H)RSiCl$_2$ where R and R' are alkyl or aryl groups. The sheet silicate mineral is the mineral apophyllite KCa$_4$Si$_8$O$_{20}$(OH,F)·8H$_2$O, and the tube silicate is the synthetic silicate K$_2$CuSi$_4$O$_{10}$. Other natural and synthetic layered and tube silicates can also be used, such as magadiite Na$_2$Si$_{14}$O$_{29}$·xH$_2$; kenyaire Na$_2$Si$_{22}$O$_{45}$·xH$_{20}$; silinaite NaLiSi$_2$O$_5$·2H$_2$; or chrysotile Mg$_3$(OH)$_4$Si$_2$O$_5$.

The sheet silicate apophyllite KCa$_4$Si$_8$O$_{20}$(OH,F)·8H$_2$O, and other of such silicates, are commercially available, and may be purchased from supply houses such as Ward's Natural Science Establishment, Rochester, N.Y. Methods of preparing the tube silicate K$_2$CuSi$_4$O$_{10}$ are described in various publications including U.S. Pat. No. 4942026 (Jul. 17, 1990); *J. Polym. Prepr.* (Am.Chem.Soc., Div.Polym.Chem.) 1991, 32 (3), 508–509; and *Colloids and Surfaces*, 1992, 63, 139–149.

The second step involves the controlled reaction of the $\equiv$SiH groups of the polymer with an olefin via a hydrosilation reaction, to produce another sheet or tube organosiloxane polymer. The intermediate and final layer polymers have an increased inter-layer spacing over that of the starting minerals. The magnitude of this spacing depends partly upon the size of the organo-H-chlorosilane and olefin reactants. For example, apophyllite has an inter-layer spacing of 7.9 Å; the intermediate hydridophenylmethylsiloxy-apophyllite sheet polymer has an inter-layer spacing of 16.7 Å based on powder X-ray diffractometry (XRD) data, and the final n-octylphenylmethylsiloxy-apophyllite polymer derived from reaction of the intermediate with 1-octene has an inter-layer spacing of 20.8 Å.

Hydrosilation reactions described herein are heterogeneous processes that take place on the surface of the intermediate layered hydrido-organofunctional siloxanes, and on the surface of the intermediate tube siloxanes. They represent a new approach for production of supramolecular structures. The number of olefin starting materials available for reaction enables tailoring numerous new sheet and tube polymers.

Ideally, equivalent amounts of the organosiloxane with pendent ≡Si—H groups and the alkenyl group containing compound should be employed in the process, and one ethylenic linkage is the theoretical equivalent of one silicon bonded hydrogen atom. It may be necessary however to use an excess of the reactant with the alkenyl group to totally consume the pendent ≡SiH groups of the organosiloxane polymer.

The maximum amount of platinum catalyst employed is determined by economical considerations, and the minimum amount by the type and purity of reactants employed. Very low concentrations of platinum catalyst such as $1\times10^{10}$ moles of catalyst per equivalent of the alkenyl group containing compound, may be used when the reactants are extremely pure. However, it is possible to use about $1\times10^8$ moles of catalyst per equivalent weight of the reactant with pendent ≡SiH groups, and even $1\times10^{-7}$ to $5\times10^{-2}$ moles platinum catalyst, per equivalent weight of the reactant with pendent ≡SiH groups.

"Moles" of platinum catalyst are measured in terms of one mole providing one unit atom (i.e., one gram atom) of platinum. An "equivalent weight" of olefin is the amount of reactant furnishing one unit weight of ethylenic unsaturation (i.e. equivalent to one unit weight of ≡Si—H), regardless of what other reactive or potentially reactive substitutents may be present. Thus, an equivalent weight of ethylene is its molecular weight.

The preferred hydrosilation catalyst is the pHlatinum complex chloroplatinic acid $H_2PtCl_6 \cdot xH_2O$ which is commercially available from Aldrich Chemical Company, Inc., Milwaukee, Wisconsin. Other platinum-based catalysts can be employed, however, such as platinum supported on active carbon particles having a diameter of 1-2 min. The amount of platinum supported on the active carbon can vary from 0.1-5% by weight based on the weight of active carbon. The platinum-on-carbon catalyst can be dried so that it is anhydrous. Other platinum complexes such as platinum acetylacetonate, or chloroplatinic acid complexed with divinyltetramethyldisiloxane and diluted in dimethylvinylsiloxy endblocked polydimethylsiloxane, can also be used. Reference may be had to any of the following US Patents for appropriate hydrosilation catalysts, i.e. U.S. Pat. Nos. 2,823,218, 3,419,359, 3,419,593, 3,445,420, 3,697,473, 3,814,731, 3,890,359, and 4,123,604.

The reaction temperature can vary, and optimum temperatures depend upon the concentration of platinum catalyst, and the nature of the reactants. The reaction can be initiated at a temperature below room temperature (0° to −10° C.). The maximum temperature is determined by the stability of the reactants. Ordinarily, it is best to keep the reaction temperature below about 300° C. Best results with most reactants are obtained by carrying out the reaction at about 60°–180° C. Heat generated by the reaction may raise the temperature up to 200°–250° C. for a short time, however.

The optimum reaction time is a variable depending upon the reactants reaction temperature and platinum catalyst concentration. Ordinarily, there is no benefit in extending the contact time of the reactants beyond 36 hours, but likewise there ms usually no harm, unless an extremely elevated temperature is employed. With many reactants, a practical yield of product can be obtained in about 3–4 hours.

The reaction can be carried out at atmospheric, sub-atmospheric, or super-atmospheric pressure. Here again, the choice of conditions is largely a matter of logic, based upon the nature of the reactants, and the equipment available. Non-volatile reactants are especially adaptable to being heated at atmospheric pressure, with or without a reflux arrangement. Reactants which are gaseous at ordinary temperatures, are preferably reacted at substantially constant volume under autogenous or induced pressure.

The alkenyl group containing compound can be an olefin (alkene) or a diolefin (alkadiene). It can have a straight chain, a branched chain, or it can be in the form of a closed ring (cyclic). The double bond can be on the first carbon atom, or it can be on other carbon atoms in the chain. Most preferred, however, are alpha-olefins and alpha, omega-dienes, because of their ease of reactivity.

Alpha-olefins $CH_2\!\!=\!\!CHR$ useable in our method include alkenes with 2–30+ carbon atoms, preferably 6–30 carbon atoms, and most preferably 6–18 carbon atoms. Some suitable alpha-olefins are ethene, propene, 1-butene, isobutylene (2-methylpropene), 1-pentene (C5), 2-methyl-1-butene, 3-methyl-1-butene, 1-hexene, 2-methyl-1-pentene 3-methyl-1-pentene, 4-methyl-1-pentene 1-heptene, 2-methyl-1-hexene, 1-octene, 2-methyl-1-heptene 1-nonene, 1-decene (C10), 1-undecene, 1-dodecene, 1-tridecene, 1-tetradecene, 1-pentadecene (C15), 1-hexadecene, 1-octadecene, 1-nonadecene, 1-eicosene (C20), and those alpha-olefin fractions containing varying percentages of C22–C30+ alpha-olefins sold under the trademarks GULFTENE® 24–28 and GULFTENE® 30+, by Chevron Chemical Company, Houston, Tex.

Alpha, omega-dienes that can be used include compounds of the formula $CH_2\!\!=\!\!CH(CH_2)_xCH\!\!=\!\!CH_2$ where x is 0–20, such as 1,3-butadiene; 1,4-pentadiene; 1,5-hexadiene; 1,6-heptadiene; 1,7-octadiene; 1,8-nonadiene; 1,9-decadiene; 1,11-dodecadiene; 1,13-tetradecadiene; and 1,19-eicosadiene.

Cycloolefins that can be used include compounds such as cyclopropene, cyclobutene, cyclopentene, cyclohexene, cyclopentadiene $C_5H_6$, and cyclooctatetraene $C_8H_8$.

Other alkenyl group containing compounds that can be used herein include 2-methyl-2-butene, isoprene, unsym-methylethylethylene, 2-pentene, 2-hexene, 2,5-dimethyl-2-hexene, and 5,5-dimethyl-2-hexene. The alkenyl group can be coupled with an aromatic nucleus, and therefore it is possible to use compounds such as styrene, divinylbenzene, allylbenzene, and 1-phenylbutadiene, if desired.

The organo-H-chlorosilane has the formula:

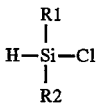

where R1 and R2 can be an alkyl group or an aryl group such as phenyl. Examples of suitable organo-H-chlorosilanes are:

| | |
|---|---|
| di-t-butylchlorosilane | $(CH_3)_3CHSiCl$ |
| diethylchlorosilane | $(C_2H_5)_2HSiCl$ |
| diisopropylchlorosilane | $[(CH_3)_2CH]_2HSiCl$ |
| dimethylchlorosilane | $(CH_3)_2HSiCl$ |
| diphenylchlorosilane | $(C_6H_5)_2HSiCl$ |
| methylethylchlorosilane | $(CH_3)(C_2H_5)HSiCl$, and |
| phenylmethylchlorosilane | $(C_6H_5)(CH_3)HSiCl$. |

The organo-H-chlorosilane can also have the formula:

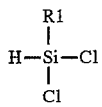

where R1 can be an alkyl group or an aryl group such as phenyl. Examples of suitable organo-H-chlorosilanes of this type are:

| | |
|---|---|
| amyldichlorosilane | $(C_5H_{11})HSiCl_2$ |
| ethyldichlorosilane | $CH_3CH_2HSiCl_2$ |
| hexadecyldichlorosilane | $n-C_{16}H_{33}HSiCl_2$ |
| hexyldichlorosilane | $CH_3(CH_2)_5HSiCl_2$ |
| isobutyldichlorosilane | $i-C_4H_9HSiCl_2$ |
| methyldichlorosilane | $CH_3HSiCl_2$ |
| phenyldichlorosilane | $C_6H_5HSiCl_2$ and |
| n-propyldichlorosilane | $n-C_3H_7HSiCl_2$. |

The following examples illustrate our invention in more detail. In particular, Example I relates to the synthesis of an apophyllite-derived hydrodimethylsiloxy sheet polymer. Example II relates to the synthesis of an apophyllite-derived hydrodiisopropylsiloxy sheet polymer. These polymers are useful in that they can be used to hydrosilylate alkenes, which will be shown in later examples.

In the examples, the polymers were characterized by Fourier Transform infrared spectroscopy (FTIR) and powder X-ray diffractometry (XRD).

EXAMPLE I

Synthesis of Apophyllite-Derived Hydridodimethylsiloxy Sheet Polymer $[(H(CH_3)_2SiO)_x((HO)_{1-x}SiO_{1.5}]_n$ A suspension of apophyllite (Poona, India, 120 mesh, 500 mg, 0.542 mmol), dimethylchlorosilane (5.0 mL, 0.046 mol), and dimethylformamide (DMF, 12 mL) was refluxed for 12 h. Additional dimethylchlorosilane was added (3.0 mL, 0.028 mol), and the mixture was refluxed for another 12 h. Finally, still more dimethylchlorosilane (3.0 mL, 0.028 mol) was added, and the mixture was refluxed for a further 12 h. The resultant product was filtered, washed with acetone, a solution of water and acetone (1:1), and acetone, and then dried (60° C., ~60 torr, 12h). The product had the following powder X-ray diffraction pattern (XRD), (d(Å)(I/$I_0$)): 13.1 (57.6), 7.68 (37.2), 4.71 (17.6), 4.54 (47.6), 3.95 (100), 3.57 (25.5), 3.35 (17.1), 3.16 (21.1), 2.98 (97.8), 2.62 (22.2), 2.48 (38.2), 2.43 (15.9), 2.19 (13.2), 2.10 (14.5), 2.00 (8.4), 1.76 (15.1), 1.58 (33.3) 1.53 (5.9), 1.49 (9.6), 1.42 (7.7), 1.36 (6.8). The following is the product infrared spectrum (IR), (Fluorolube, Nujol mulls, $cm^{-1}$): 3554 (s, free OH stretch), 3324 (w br, H-bonded OH stretch), 2966 (m CH stretch), 2146 (m SiH stretch) 1064 (s SiO stretch). The product was a white solid. It dispersed in, but did not dissolve in hexane and toluene. It was very hydrophobic and did not mix with or disperse in $H_2O$.

In the procedure used in this synthesis of the apophyllite-derived hydridodimethylsiloxy sheet polymer $[H(CH_3)_2SiO)_x(HO)_{1-x}SiO_{1.5}]_n$, the reaction temperature was held to a low value (~50° C.) by the low boiling point of the chlorosilane used, i.e., 36° C. To compensate, a long reaction time was used. The product of this procedure gave an infrared spectrum showing both CH and SiH bands. The presence of these bands suggests that the product contained the desired polymer. The product gave an X-ray powder pattern showing a moderately strong line at 13.1 Å, and a series of lines at positions near those expected for apophyllite. The 13.1 Å line is in the range expected for an apophyllite-derived polymer of this general type, i.e., an apophyllite-derived trimethylsiloxy sheet polymer gives a line at 15.0 Å. The presence of the 13.1 Å line thus suggests that the product contained the desired polymer. The insolubility of the polymer is expected, as analogous alkyl and alkenyl sheet polymers are also insoluble. The reaction carried out in this example can be represented as:

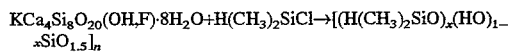

EXAMPLE II

Synthesis of Apophyllite-Derived Hydridodiisopropylsiloxy Sheet Poller $[(H((CH_3)_2CH)_2SiO)_x(HO)_{1-x}SiO_{1.5}]_n$ A suspension of apophyllite (120 mesh, 800 mol), 0.867 mmol), diisopropylchlorosilane (10 mL, 0.058 mol), and dimethylforamide (15 mL) was heated (~110° C.) with stirring for 10 h. The resultant material was filtered, washed with acetone, a solution of water and acetone, and acetone, and then dried (60° C., ~60 torr, 12 h). XRD (d(Å) (I/$I_0$)): 17.1 (100). IR (Fluorolube, Nujol mulls, $cm^{-1}$): 3554 (vw, free OH stretch), 3422 (w br, H-bonded OH stretch), 2946 (m, CH stretch), 2868 (m, CH stretch), 2126 (m, SiH stretch), 1062 (s, SiO stretch). The product was a white solid. It dispersed in, but did not dissolve in hexane and toluene. It was hydrophobic and did not mix with or disperse in water.

The procedure used in the synthesis of the apophyllite-derived hydridodiisopropylsiloxy sheet polymer $[H((CH_3)_2CH)_2SiO)_x (HO)_{1-x}SiO_{1.5}]_n$ in this example is similar to that used for its dimethyl analogue in Example I. However, in this example, the reaction temperature (~110° C.) was not unduly restricted by the boiling point of the chlorosilane used, i.e., 137° C. The product of this example gave an infrared spectrum showing both CH and SiH bands. The presence of these bands suggests that the product was the desired polymer The product gave an X-ray powder pattern showing as its only significant line, a line at 17.1 Å. This line is in the range expected for the desired polymer, and its presence indicates that the product was the desired polymer. The intensity and narrowness of the 17.1 Å line provides strong evidence indicating that the polymer was composed of flat sheets which were stacked with a regular spacing. On the basis of the known structure of the sheet in apophyllite, these sheets are believed to be composed of fused 8-membered and 16-membered rings. The lack of additional significant lines in the X-ray powder pattern of the polymer, indicates that the sheets were not in registry. Again, the insolubility of the polymer is as expected. The reaction carried out in this example can be represented as:

$$KCa_4Si_8O_{20}(OH,F)\cdot 8H_2O + H[(CH_3)_2CH]_2SiCl \rightarrow$$
$$[(H((CH_3)_2CH)_2SiO)_x(HO)_{1-x}SiO_{1.5}]_n$$

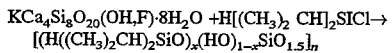

As noted above, polymers prepared according to Examples I and II are able to hydrosilylate alkenes. Because there are many alkenes, it follows that many sheet polymers tailored to specific property profiles can be made from such materials.

The following additional examples are directed to the synthesis of a hydridophenylmethylsiloxy sheet polymer derived from apophyllite (EXAMPLE III), and the synthesis of an n-octylphenylmethylsiloxy sheet polymer derived from the hydridophenylmethylsiloxy sheet polymer derived from apophyllite (EXAMPLE III), by hydrosilylation (EXAMPLE VI). Other hydrosilylations using polymers prepared according to EXAMPLES I and II are also shown, i.e., EXAMPLES IV and V. The routes to these types of polymers are significant, as they illustrate new and flexible routes to siloxy sheet and tube polymers.

EXAMPLE III

Synthesis of Hydridophenylmethylsiloxy Sheet Polymer Derived from Apophyllite $[((H) (C_6H_5) (CH_3)SiO)_x(HO)_{1-x}SiO_{1.5}]_n$ A suspension of apophyllite (120 mesh, 2.40 g, 2.60 mmol), phenylmethylchlorosilane (15.0 g, 95.7 mmol), and dimethylformamide (100 mL) was heated (~140° C.) with stirring for 19 h and filtered. The solid was washed with acetone, a solution of water and acetone (1:1), and acetone, then dried (60° C., ~60 torr, 12 h) and weighed (2.64 g). XRD (d(Å) (I/I₀)): 16.7 (100). IR (Fluorolube, Nujol mulls, cm⁻¹): 3552 (w, free OH stretch), 3388 (w br, H-bonded OH stretch), 3072 (w, C=C—H stretch), 3050 (w, C≡C—H stretch), 2964 (w, CH stretch), 2152 (m, SiH stretch), 1062 (rs br, SiO stretch). The polymer prepared in this example was a white solid. It dispersed in, but did not dissolve in hexane and toluene. It was hydrophobic and did not mix with or disperse in water.

The route used for the synthesis of this apophyllite-derived hydridophenylmethylsiloxy sheet polymer $[((H) (C_6H_5) (CH_3)SiO)_x(HO)_{1-x}SiO_{1.5}]_n$ is the same as that used above for the dimethyl (EXAMPLE I) and diisopropyl (EXAMPLE II) analogues. However, in contrast to the dimethyl polymer reaction in EXAMPLE I, the reaction temperature (~140° C.) in this example was not unduly restricted by the boiling point of the chlorosilane used, i.e., 113° C., 100 torr, and was within the range desired. The product in this example gave an infrared spectrum showing both CH and SiH bands. The presence of these bands suggests that the product was the desired polymer. This product gave an X-ray powder pattern showing as its only significant line, a line at 16.7 Å. This line is in the range expected, and its presence indicates that the product was the desired polymer. The intensity and narrowness of the 16.7 Å line provides strong evidence indicating that the polymer was composed of flat sheets which were stacked with regular spacing. The lack of additional significant lines in the X-ray powder pattern of the polymer indicates that the sheets were not in registry. The insolubility of the polymer is expected. The reaction carried out in this example can be represented as:

$$KCa_4Si_8O_{20}(OH,F)\cdot 8H_2O + (H)(C_6H_5)(CH_3)SiCl \rightarrow$$
$$[((H)(C_6H_5)(CH_3)SiO)_x(HO)_{1-x}SiO_{1.5}]_n$$

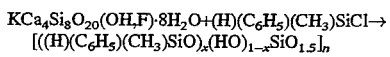

EXAMPLE IV

Preparation of n-Hexyldiisopropylsiloxy Sheet Polymer Derived from Hydridodiisopropylsiloxy Sheet polymer $[((n-C_6H_{13}) ((CH_3)_2CH)_2SiO)_x(HO)_{1-x}SiO_{1.5}]_n$ In another experiment, the hydridodiisopropylsiloxy polymer prepared in EXAMPLE II was heated with 1-hexene in the presence of $H_2PtCl_6\cdot xH_2O$ catalyst. The product gave a powder pattern with a line at 18.4 Å. It should be noted that while the main line in the powder pattern of this product is at 18.4 Å, the main line in the powder pattern of the parent hydridodiisopropylsiloxy polymer in EXAMPLE II is at 17.1 Å. The 1.3 Å difference in positions is sufficiently large to indicate that hydrosilylation of the parent hydridodiisopropylsiloxy polymer in EXAMPLE II took place.

EXAMPLE V

Preparation of n-Hexyldimethylsiloxy Sheet Polymer Derived from Hydridodimethylsiloxy Sheet Polymer $[((n-C_6H_{13}) (CH_3)_2SiO)_x(HO)_{1-x}SiO_{1.5}]_n$ In another experiment the hydridodimethylsiloxy polymer prepared in EXAMPLE I was heated with 1-hexene in the presence of $H_2PtCl_6\cdot xH_2O$ catalyst. The product gave a powder pattern with a line at 16.3 Å. Again, it should be noted that while the main low-angle line in the powder pattern of this product is at 16.3 Å, the corresponding line in the parent hydridodimethylsiloxy polymer in EXAMPLE I is at 13.1 Å. The 3.2 Å difference in positions of the lines indicates the occurrence of substantial hydrosilylation of the parent hydridodimethylsiloxy polymer in EXAMPLE I.

EXAMPLE VI

Preparation of n-Octylphenylmethylsiloxy Sheet Polymer Derived from Hydridodimethylsiloxy Sheet Polymer $[((n-C_8H_{17}) (C_6H_5) (CH_3)SiO)_x(HO)_{1-x}SiO_{1.5}]_n$ A mixture of the hydridophenylmethylsiloxy sheet polymer prepared in EXAMPLE III (0.42 g, 3.3 mmol, assuming a 50% level of substitution), 1-octene (9.0 mL, 57 mmol), and a solution of platinum divinyltetramethyldisiloxane complex in xylene (2-3% platinum, 0.4 mL) was heated (~120° C.) with stirring for 26 h and filtered. The solid was washed with acetone, ethanol, a solution of water and acetone (1:1), and acetone, then dried (60° C., ~60 torr, 12 h), and weighed (0.43 g). XRD (d(Å)(I/I₀)): 20.8 (100). IR (Fluorolube, Nujol mulls, cm⁻¹): 3552 (m, free OH stretch), 3390 (vw br, H-bonded OH stretch), 3072 (w, C=C—H stretch) 3050 (w C=C—H stretch) 2958 (m, CH stretch) 2926 (m, (vs SiO stretch) 1042 (m) This product was a gray solid It pattern and infrared spectrum of this product showed that it was the desired polymer. The intensity and narrowness of the main line at 20.8 Å in the powder pattern indicated that the sheets of the polymer were quite flat and quite regularly stacked. In this example, a relatively high reaction temperature was permitted by the boiling point of 1-octene (122° C.). The catalyst in this example was platinum divinyltetramethyldisiloxane. The reaction carried out in this example can be represented as:

[((H)(C₆H₅)(CH₃)SiO)ₓ(HO)₁₋ₓSiO₁.₅]ₙ+CH₂=CH(CH₂)₅CH₃→
[((n—C₈H₁₇)(C₆H₅)(CH₃)SiO)ₓ(HO)₁₋ₓSiO₁.₅]ₙ.

A method for preparing the tube silicate $K_2CuSi_4O_{10}$ is taught in U.S. Pat. No. 4942026. The following example shows an alternative method for preparing the tube silicate, which method is also described in U.S. application Ser. No. 08/542,081, filed Oct. 12, 1995, in the name of Timothy Chi-Shan Chao, Malcolm E. Kenney, and Dimitris E. Katsoulis.

EXAMPLE VII

Preparation of $K_2CuSi_4O_{10}$

This procedure was patterned after the procedure of U.S. Pat. No. 4942026. In succession, a solution of KOAc (15.8 g, 161 mmole) and $H_2O$ (160 mL), $Si(OC_2H_5)_4$ (66.7 g, 320 mmole), and $NH_4OH$ (30 wt. %, 2.0 mL, 51 mmole) were added to a stirred mixture of $Cu(OAc)_2·H_2O$ (16.1 g 80 6 mmole) and ethanol (320 mL) which was maintained at 40° C. (oil bath). The resulting mixture was stirred at room temperature for 3 days, allowed to stand for 2 days, and evaporated to dryness with a rotary evaporator (~80 torr, 70° C). The solid was dried (~80 torr, 90° C.) for 24 h, ground to a powder, heated (Pt crucible, 200° C.) under a slow flow of air (~100 mL/min) for 24 h, further heated (Pt crucible, 590° C.) under a slow flow of air (~100 mL/min) for 19 h, pelletized, and heated (Pt crucible, 750° C.) under a slow flow of $N_2$ (~100 mL/min) for 7 days. The composition of the resultant material was verified by comparison of its X-ray powder pattern with literature powder pattern data (30.0 g, 72.4 mmole, 91% based on $Si(OC_2H_5)_4$). XRD (d(Å) (I/Io)): 3.22 (100), 4.12 (53), 3.07 (42), 3.36 (41), 2.67 (29). The compound was a bluish-purple solid.

Other variations may be made in the compounds, compositions, and methods described without departing from the essential features of the invention. The forms of invention are exemplary and not limitations on its scope as defined in the claims.

We claim:

1. A method of making an organopolysiloxane sheet or tube polymer comprising contacting a sheet or tube silicate with an organo-H-chlorosilane to form an organosiloxane sheet or tube polymer with pendent ≡Si—H groups, and subsequently contacting the organosiloxane sheet or tube polymer with pendent ≡Si—H groups with an alkenyl group containing compound in the presence of a hydrosilation catalyst, in an amount effective to catalyze a hydrosilation reaction between the alkenyl group on the alkenyl group containing compound and hydride functionality on the organosiloxane sheet or tube polymer with pendent ≡Si—H groups, to form the organopolysiloxane sheet or tube polymer.

2. A method according to claim 1 in which the sheet silicate is apophyllite $KCa_4Si_8O_{20}(OH,F)·8H_2O$ and the tube silicate is $K_2CuSi_4O_{10}$.

3. A method according to claim 1 in which the silicate is selected from the group consisting of magadiite $Na_2Si_{14}O_{29}·xH_2O$, kenyaire $Na_2Si_{22}O_{45}·xH_2O$, silinaite $NaLiSi_2O_5·2H_2O$, and chrysotile $Mg_3(OH)_4Si_2O_5$.

4. A method according to claim 1 in which the organo-H-chlorosilane is a compound having the formula

```
    R1
    |
H—Si—Cl
    |
    R2
``` or the formula

```
    R1
    |
H—Si—Cl
    |
    Cl
``` where R1 and R2 are an alkyl group or an aryl group.

5. A method according to claim 4 in which the compound is selected from the group consisting of

| | |
|---|---|
| di-t-butylchlorosilane | $(CH_3)_3CHSiCl$ |
| diethylchlorosilane | $(C_2H_5)_2HSiCl$ |
| diisopropylchlorosilane | $[(CH_3)_2CH]_2HSiCl$ |
| dimethylchlorosilane | $(CH_3)_2HSiCl$ |
| diphenylchlorosilane | $(C_6H_5)_2HSiCl$ |
| methylethylchlorosilane | $(CH_3)(C_2H_5)HSiCl$ |
| phenylmethylchlorosilane | $(C_6H_5)(CH_3)HSiCl$ |
| amyldichlorosilane | $(C_5H_{11})HSiCl_2$ |
| ethyldichlorosilane | $CH_3CH_2HSiCl_2$ |
| hexadecyldichlorosilane | n-$C_{16}H_{33}HSiCl_2$ |
| hexyldichlorosilane | $CH_3(CH_2)_5HSiCl_2$ |
| isobutyldichlorosilane | i-$C_4H_9HSiCl_2$ |
| methyldichlorosilane | $CH_3HSiCl_2$ |
| phenyldichlorosilane | $C_6H_5HSiCl_2$ and |
| n-propyldichlorosilane | n-$C_3H_7HSiCl_2$. |

6. A method according to claim 1 in which the alkenyl group containing compound is an olefin, a diene, or a cycloolefin.

7. A method according to claim 6 in which the compound is selected from the group consisting of ethene, propene, 1-butene, 2-methylpropene, 1-pentene, 2-methyl-1-butene, 3-methyl-1-butene, 1-hexene, 2-methyl-1-pentene, 3-methyl-1-pentene, 4-methyl-1-pentene, 1-heptene, 2-methyl-1-hexene, 1-octene, 2-methyl-1-heptene, 1-nonene, 1-decene, 1-undecene, 1-dodecene, 1-tridecene, 1-tetradecene, 1-pentadecene, 1-hexadecene, 1-octadecene, 1-nonadecene, 1-eicosene, alpha-olefin fractions containing C22–C30+ alpha-olefins, 1,3-butadiene, 1,4-pentadiene, isoprene, 1,5-hexadiene, 1,6-heptadiene, 1,7-octadiene, 1,8-nonadiene, 1,9-decadiene, 1,11-dodecadiene, 1,13-tetradecadiene, 1,19-eicosadiene, cyclopropene, cyclobutene, cyclopentene, cyclohexene, cyclopentadiene $C_5H_6$, cyclooctatetraene $C_8H_8$, 2-methyl-2-butene, unsymmethylethylethylene, 2-pentene, 2-hexene, 2,5-dimethyl-2-hexene, 5,5-dimethyl-2-hexene, styrene, divinylbenzene, allylbenzene, and 1-phenylbutadiene.

8. A method according to claim 1 in which the hydrosilation catalyst is chloroplatinic acid.

9. An organopolysiloxane sheet or tube polymer prepared according to the method defined in claim 1.

10. An organopolysiloxane sheet or tube polymer prepared according to the method defined in claim 2.

11. An organopolysiloxane sheet or tube polymer prepared according to the method defined in claim 3.

12. An organopolysiloxane sheet or tube polymer prepared according to the method defined in claim 4.

13. An organopolysiloxane sheet or tube polymer prepared according to the method defined in claim 5.

14. An organopolysiloxane sheet or tube polymer prepared according to the method defined in claim 6.

15. An organopolysiloxane sheet or tube polymer prepared according to the method defined in claim 7.

16. An organopolysiloxane sheet or tube polymer prepared according to the method defined in claim 8.

* * * * *